(12) United States Patent
Horiguchi et al.

(10) Patent No.: US 7,029,775 B2
(45) Date of Patent: *Apr. 18, 2006

(54) FUEL CELL SYSTEM

(75) Inventors: Munehisa Horiguchi, Hokkaido (JP); Noriyuki Takada, Hokkaido (JP)

(73) Assignee: Kabushikikaisha Equos Research, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 09/917,662

(22) Filed: Jul. 31, 2001

(65) Prior Publication Data

US 2002/0025460 A1 Feb. 28, 2002

Related U.S. Application Data

(62) Division of application No. 09/213,241, filed on Dec. 17, 1998, now abandoned.

(30) Foreign Application Priority Data

Dec. 22, 1997 (JP) .................... 9-365850
Mar. 2, 1998 (JP) .................... 10-67885

(51) Int. Cl.
H01M 8/04 (2006.01)
H01M 4/96 (2006.01)

(52) U.S. Cl. .................... 429/13; 429/23; 429/24; 429/26; 429/42

(58) Field of Classification Search .................... 429/13, 429/22, 23, 24, 26, 34, 39, 42
See application file for complete search history.

(56) References Cited

U.S. PATENT DOCUMENTS 4,000,003 A   12/1976  Baker et al. .................... 429/7
4,293,396 A * 10/1981  Allen et al. .................... 205/533
4,324,844 A    4/1982  Kothmann .................... 429/26
4,585,708 A    4/1986  Abens et al. .................... 429/17
4,826,741 A    5/1989  Aldhart et al. ................. 429/19
5,085,949 A *  2/1992  Sanderson et al. ............. 429/23
5,139,894 A    8/1992  Mizuno et al. ................. 429/9
5,200,278 A *  4/1993  Watkins et al. ................ 429/24
5,316,870 A    5/1994  Ohga .......................... 429/24
5,350,117 A *  9/1994  Kleinberger et al. ..... 239/428.5
5,360,461 A   11/1994  Meinzer ........................ 48/61
5,434,016 A    7/1995  Benz et al. .................... 429/13

(Continued)

FOREIGN PATENT DOCUMENTS

DE        19648995   *  4/1997

(Continued)

Primary Examiner—Jonathan Crepeau
(74) Attorney, Agent, or Firm—Bacon & Thomas, PLLC

(57) ABSTRACT

A fuel cell power generating apparatus (1) using a fuel cell (10) having a cathode (11) and an anode (13) disposed on opposite sides of an electrolyte membrane (12) has an air supply passage (31) through which atmospheric air is supplied to the cathode. A fuel gas supply passage (22) supplies a fuel gas such as hydrogen gas is supplied to the anode. A water spray nozzle (41) ejects liquid water onto the surface of the cathode and the sprayed water takes heat from the air around the cathode as latent heat of evaporation, which is effective to prevent dehydration of the electrolyte membrane, as well as to cool the cathode which would otherwise become overheated when the fuel cell operates continuously over a long period of time. When starting operation of the apparatus, the nozzle is made operative to eject water onto the cathode before the fuel gas is first supplied to the anode to prevent the supplied fuel gas from reacting with oxygen in air which might remain around the cathode.

17 Claims, 16 Drawing Sheets

U.S. PATENT DOCUMENTS

| | | | |
|---|---|---|---|
| 5,441,819 A | 8/1995 | Voss et al. | 429/13 |
| 5,763,113 A * | 6/1998 | Meltser et al. | 429/13 |
| 5,766,786 A | 6/1998 | Fleck et al. | 429/17 |
| 5,958,613 A | 9/1999 | Hamada et al. | 429/26 |
| 6,013,385 A | 1/2000 | DuBose | 429/17 |
| 6,376,110 B1 * | 4/2002 | Koschany | 429/13 |
| 6,537,692 B1 * | 3/2003 | Horiguchi et al. | 429/22 |

FOREIGN PATENT DOCUMENTS

| | | | |
|---|---|---|---|
| EP | 817298 A1 | | 1/1998 |
| JP | 60-136178 | | 7/1985 |
| JP | 05-029013 | * | 2/1993 |
| JP | A05-054900 | | 3/1993 |
| JP | A07-263010 | | 10/1995 |
| JP | 10-106600 | | 4/1998 |
| JP | A11-135133 | | 5/1999 |
| JP | A11-162490 | | 6/1999 |
| JP | A11-191423 | | 7/1999 |
| WO | 95/25357 | | 9/1995 |

* cited by examiner

FIG.11

| | TEST SAMPLE | 1 | 2 | 3 | 4 | 5 | 6 | 7 | 8 | 9 | 10 | 11 | 12 |
|---|---|---|---|---|---|---|---|---|---|---|---|---|---|
| CONDITIONS | SPRAY WATER QTY. (g/min. cell) | 0 | 31 | 40 | 44 | 0 | 31 | 40 | 44 | 0 | 31 | 40 | 44 |
| | SPRAY WATER TEMP. (°C) | 21.5 | 21.5 | 21.5 | 21.5 | 21.5 | 21.5 | 21.5 | 21.5 | 21.5 | 21.5 | 21.5 | 21.5 |
| | AIR FLOW RATE (l/min) | 56 | 56 | 56 | 56 | 56 | 56 | 56 | 56 | 56 | 56 | 56 | 56 |
| | AIR TEMP. (°C) | 26 | 26 | 26 | 26 | 26 | 26 | 26 | 26 | 26 | 26 | 26 | 26 |
| | WATER TEMP. IN COOLING PLATE (°C) | 0.8 | 0.8 | 0.8 | 0.8 | 0.8 | 0.8 | 0.8 | 0.8 | 0.8 | 0.8 | 0.8 | 0.8 |
| RESULTS | F/C WALL TEMP. (°C) | 35.1 | 31.3 | 31.8 | 31.3 | 48.5 | 41 | 41 | 40.5 | 61.4 | 50.4 | 49 | 47.8 |
| | F/C DISCHARG GAS TEMP. (°C) | 38.5 | 33.4 | 33.4 | 33.3 | 57.3 | 46.8 | 46.3 | 46.5 | 75.7 | 56.3 | 55.2 | 53.6 |
| | WATER TEMP. AT F/C INLET (°C) | 39.6 | 39.5 | 39.6 | 39.6 | 59.3 | 58.8 | 59 | 58.9 | 78.4 | 76.9 | 75 | 73.5 |
| | WATER TEMP. AT F/C OUTLET (°C) | 38.9 | 34.4 | 34.1 | 33.8 | 57.9 | 47.8 | 47.2 | 46.9 | 76.7 | 61 | 58.7 | 57.6 |

FUEL CELL SYSTEM

CROSS-REFERENCE TO RELATED APPLICATION

This application is a division of U.S. Ser. No. 09/213,241, filed Dec. 17, 1998, now abandoned.

BACKGROUND OF THE INVENTION

1. Field of the Invention

The present invention relates to a fuel cell system and more particularly to a fuel cell system using a proton exchange membrane as an electrolyte.

2. Description of the Prior Art proton exchange membrane fuel cell comprises a proton exchange membrane (PEM) between two electrodes, that is, a cathode to which an oxidizing gas is supplied and an anode to which fuel gas is supplied. The PEM acts as an electrolyte and transports therethrough hydrogen ions obtained at the anode of the fuel cell toward the cathode, in the form of protons (H+). Each of the electrodes comprises a catalyst layer deposited on a porous base member through which the reactant gas is supplied. Mounted externally of each electrode is a separator or connector plate with grooves permitting the reactant gas to be introduced into the electrode at a constant flow rate. Excess gas which has not been consumed by the fuel cell reaction is exhausted to the open air through the grooved separator. The electricity generated by the energy conversion reaction at the anode is collected at the electrode porous base member and transported outside of the fuel cell system through the separator. In actual application, the system includes a plurality of fuel cells which are stacked in series with the separator being interposed between adjacent fuel cells.

Since the fuel cell generates heat in correspondence to the electric power generated, a fuel cell stack 100 usually includes cooling plates 103 between fuel cells 101, 101 at predetermined intervals, as shown in FIG. 9. Each cooling plate has a passage for a cooling medium such as air and water to prevent excessive overheating of fuel cells 101 in operation.

The proton flow becomes hydrated when being transferred through the PEM electrolyte, so that the PEM tends to be dehydrated as the fuel cell reaction proceeds. The PEM must always be properly humidified to prevent decrease of ion-conductivity and energy conversion efficiency. In the conventional designs, hydrogen gas is humidified by suitable means which, in turn, humidify the PEM as the hydrogen gas is supplied to the anode.

Various attempts have also been proposed to humidify the air to be supplied to the cathode. Since the cathode of the fuel cell in operation has been heated to 80° C. for example, the room temperature air should be preheated by a humidifier so that its vapor content becomes consistent with the ambient vapor condition of the cathode. Such a humidifier, that is required to have a water supplying function and an air preheating function, can not be simple in construction.

In Japanese patent un-examined publication No. 7-14599, there is provided a water injection nozzle for injecting a necessary quantity of water into an air introducing pipe through which air is supplied to the cathode of the PEM fuel cell. Since the nozzle is located upstream of a compressor, liquid water injected from the nozzle is evaporated when subjected to heat generated by the compressor. Thus, the cathode is humidified by vapor, not by liquid water.

In the fuel cell system of Japanese patent un-examined publication No. 9-266004, a discharge gas from the anode containing hydrogen gas which has not been consumed during the anodic reaction is introduced into the cathode where the unconsumed hydrogen in the discharge gas is combusted with oxygen to generate water, which well humidifies the PEM electrolyte. In this system, there is no need to install a humidifier for humidifying the air to be supplied to the cathode.

During operation of the fuel cell system, electrons produced at the anode are moved to the cathode where they react with oxygen in the air or any other oxidizing gas supplied thereto to produce water. Accordingly, in accordance with the conventional practice in the art, there is a greater need to humidify the hydrogen gas to be supplied to the anode, than at the cathode where water can at least partially be self-sustaining.

SUMMARY OF THE INVENTION

The inventors have now found that water produced at the cathode permeates through PEM electrolyte toward the anode, which makes it unnecessary to humidify the hydrogen gas to be supplied to the anode. On the other hand, the quantity of water in the PEM electrolyte at the cathode side tends to decrease by contact with the air flow to the cathode. Such finding is contradictory to the conventional wisdom and has been first recognized by the present inventors.

Accordingly, it is an object of the present invention to provide a fuel cell system, based on the above-described finding, which is capable of maintaining a proton exchange membrane in a suitably moist condition.

Another object of the present invention is to provide a fuel cell system which is simple in construction, small in size, easy to install and, therefore, particularly suitable to be mounted on a vehicle.

According to an aspect of the present invention there is provided a fuel cell system in which water is supplied to the surface of the cathode not in a vapor state, but in a liquid state. Thus, the fuel cell system of the present invention comprises one or more fuel cells each having an anode, a cathode and an electrolyte membrane interposed between the anode and the cathode; first gas supply means for supplying a first gas including fuel gas to the anode; second gas supply means for supplying a second gas including oxygen to the cathode; and liquid water supplying means for supplying liquid water to the surface of the cathode. Liquid water may be sprayed onto the surface of the cathode. The supply of liquid water may be intermittent. In a preferred embodiment, a nozzle is provided to spray or inject liquid water onto the surface of the cathode.

With this fuel cell system, liquid water supplied to the surface of the cathode takes latent heat from the air around the cathode to prevent evaporation of water from the electrolyte membrane. Thus, the electrolyte membrane is prevented from being excessively dried and is maintained in a suitably moist condition, which improves performance and durability of the fuel cell system. The supply of liquid water to the surface of the cathode is also effective to cool the cathode and thus the fuel cell stack, which makes it unnecessary to install cooling plates in the stack as in the prior art design.

Preferably, liquid water is sprayed onto the surface of the cathode since it is more effective to take latent heat from the air. Although the fuel cell system of Japanese patent unexamined publication No.7-14599 discloses the water injection nozzle at the air supplying side, the sprayed liquid water is evaporated before entering the cathode. The concept of supplying liquid water to the cathode is not at all taught by this prior art. The present invention does not need pre-heating of the air to be supplied to the cathode, which function has been required in the humidifier of the conventional system.

The supply of liquid water to the cathode is particularly effective to cool the cathode which has been heated to a temperature higher than at the anode when the fuel cell system is running. This simplifies the system structure and reduces the overall weight because the fuel cell stack 110 does not need the cooling plates 103 (FIG. 9) as in the conventional system, as shown in FIG. 10.

The supply of liquid water may be continuous or intermittent. When liquid water is intermittently supplied, a lower electric power is sufficient to drive a pump or any suitable device to convey liquid water from a water tank. In the conventional system in which the air to be supplied to the cathode is humidified with vapor, it has been necessary to continuously generate vapor and pre-heat the air to a predetermined temperature, which needs much greater electric power to drive the humidifying device.

The present invention is particularly useful when applied to a fuel cell system in which water generated by the fuel cell reaction is fed to the electrolyte membrane and which has no special equipment for humidification of the electrolyte membrane. In this type fuel cell system, a suitable moist condition of the electrolyte membrane is maintained only by the reactant water generated at the cathode by combustion or reaction of a fuel gas and oxygen. There is no need to constantly supply water to the cathode because of the presence of the reactant water at the cathode. The nozzle is operated to spray liquid water to the cathode only when the moisture condition at the surface of the electrolyte membrane facing the cathode is decreased to below a predetermined critical level to decrease the fuel cell performance. This should be compared with the conventional system in which the humidifying device is continuously driven to humidify the air supplied to the cathode. Accordingly, the fuel cell system of the present invention in which no humidifying device is employed has the advantage of minimizing the energy consumed in the system.

When the fuel cell system of the present invention should be started, in preferred operation, liquid water is injected onto the cathode before the fuel gas is first supplied to the anode, and the fuel cell system is connected to supply the electricity generated to an external device (a vehicle drive motor, for example) after the output from the fuel cell system reaches a predetermined level as the reaction proceeds. If the fuel cell system is inoperative for a long period of time, the air remaining around the cathode can possibly permeate through the electrolyte membrane toward the anode, creating the possibility of a reaction with the fuel gas to cause an explosion and damage to the membrane. To prevent this, the cathode is preferably cooled by spraying it with liquid water before the fuel gas is supplied to the anode. Such operation is also effective to quickly humidify the membrane which may have been become dried after a long inoperative period. Liquid water directly sprayed onto the surface of the cathode can be smoothly absorbed into the dry membrane because of high osmotic pressure. The quantity of liquid water at the initial stage operation of the fuel cell system should preferably be somewhat larger than that in normal operation to keep a suitable level of moisture in the electrolyte membrane.

BRIEF DESCRIPTION OF THE DRAWINGS

The foregoing and other objects and features of the present invention become apparent from the following description when read in conjunction with the accompanying drawings in which:

FIG. 11 is a table showing the test conditions and results in which the present invention shows improved cooling capacity;

DETAILED DESCRIPTION OF THE PREFERRED EMBODIMENTS

Figure 1:
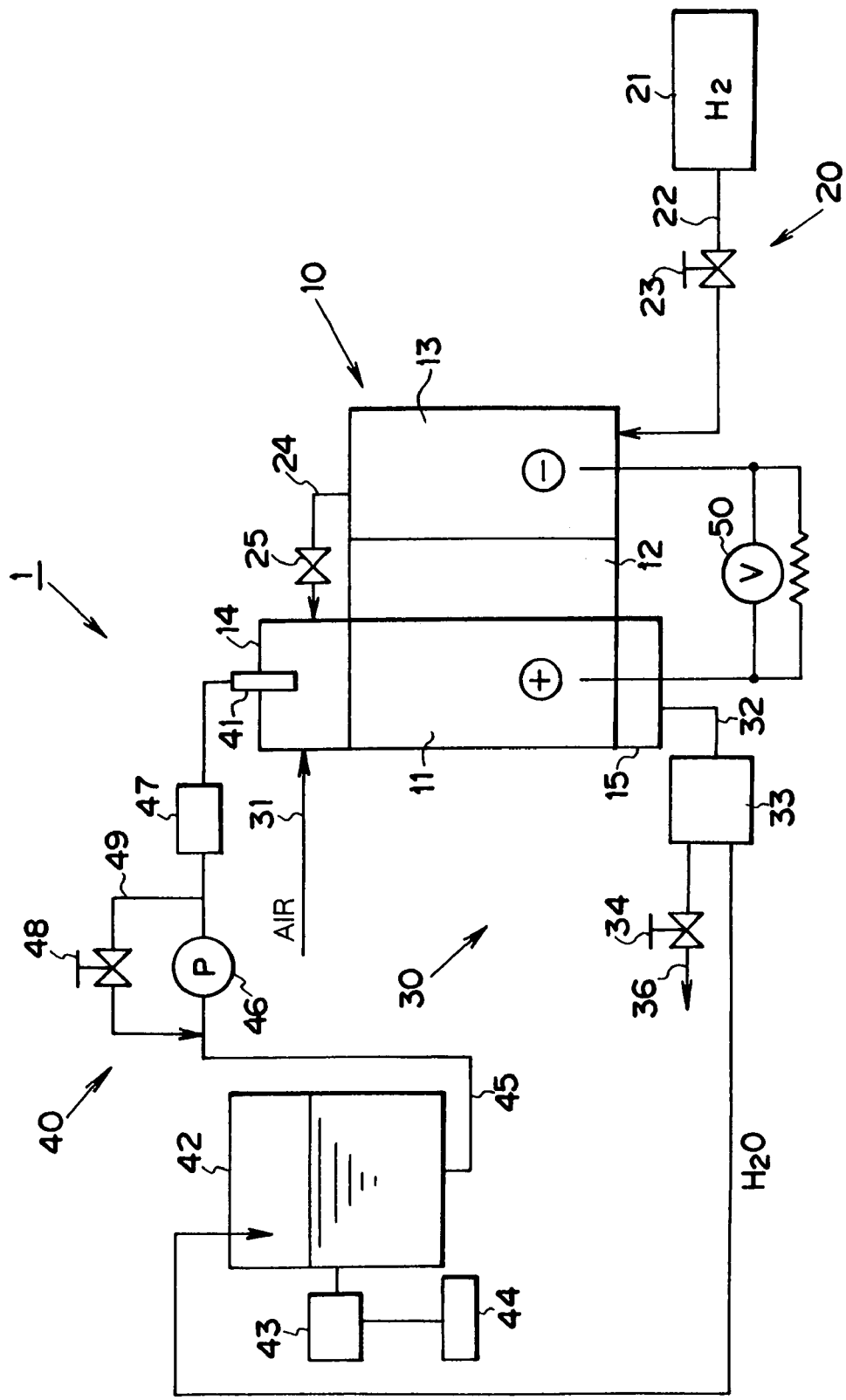
FIG. 1 is a schematic view diagrammatically showing the structure of a fuel cell power generating apparatus embodying the present invention.

FIG. 1 diagrammatically shows the structure of a fuel cell power generating apparatus 1 according to an embodiment of the present invention, which comprises in general a proton exchange electrolyte fuel cell 10, a fuel gas supply system 20, an air supply system 30 and a water supply system 40.

Figure 2:
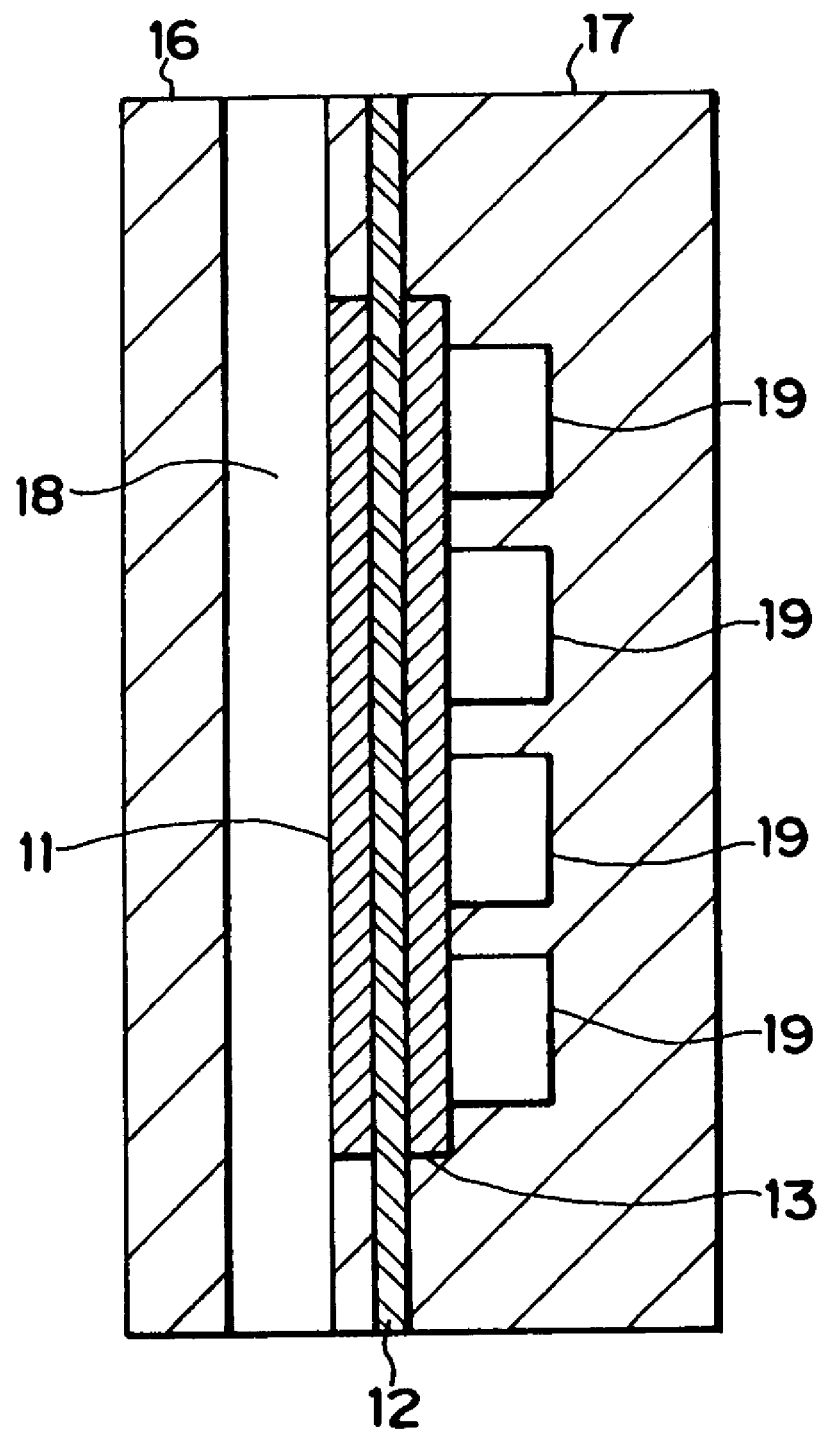
FIG. 2 is a schematic view showing the structure of a single fuel structure in the apparatus shown in FIG. 1.
Figure 3:
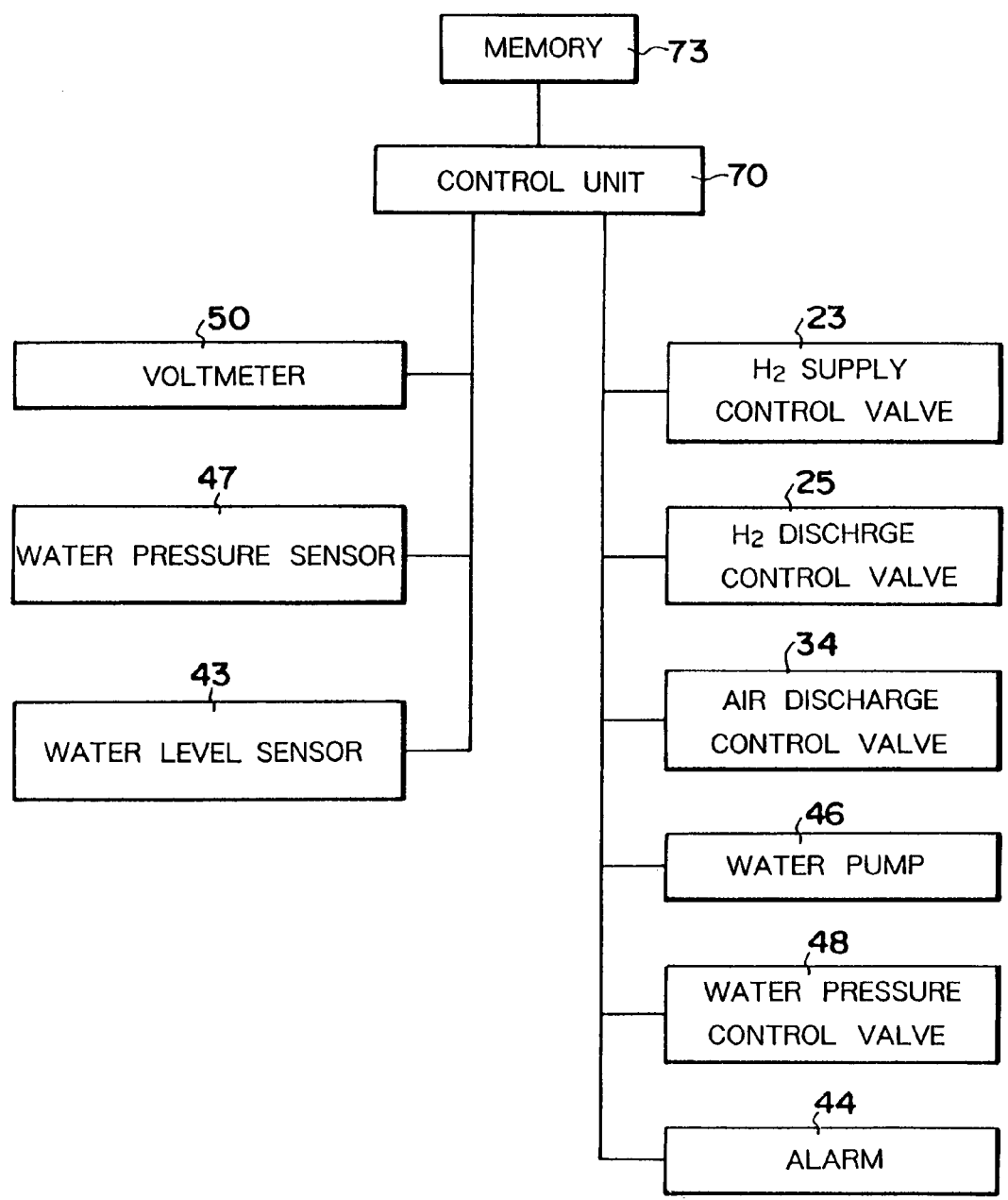
FIG. 3 is a block diagram of the control system for the apparatus shown in FIG. 1.

Shown in FIG. 2 is a single fuel cell structure which, as known in the art, comprises an air electrode or cathode 11, a fuel electrode or anode 13 and an electrolyte membrane 12 interposed therebetween. In actual application, a plurality of the fuel cells are stacked with one another to form a fuel cell stack. An air intake manifold 14 with a water injection nozzle 41 and an air outlet manifold 15 are mounted above and beneath cathode 11, respectively. Air intake manifold 14 has a relatively long vertical dimension which is sufficient to allow water to be injected from nozzle 41 onto the whole surface of cathode 11. Water from nozzle 41 may be discharged through air outlet manifold 15.

In a modified design, nozzle 41 may be mounted on the side wall of air inlet manifold 14. In this modification, water injected from nozzle 41 may be dispersed onto the entire surface area of cathode 11, which allows air inlet manifold 14 to be shorter than that shown in FIG. 1 which is provided with nozzle 41 at the top thereof, resulting in reduction in size of fuel cell 10.

As shown in FIG. 2, a single fuel cell unit comprising cathode 11/membrane 12/anode 13 is formed as a thin film, which is held between a pair of carbon connector plates or separators 16, 17. Connector plate or separator 16 facing toward cathode 11 is provided with a plurality of grooves 18 extending vertically through air intake manifold 14 and air outlet manifold 15. Grooves 18 not only act as air flow passages but also permit water from nozzle 41 to drop from the top to the bottom of cathode 11.

On the other hand, connector plate 17 facing anode 13 is provided with a plurality of grooves 19 for passing a hydrogen gas therethrough, which grooves extend horizontally in the embodiment shown but may extend vertically, that is, in parallel with air flow passage grooves 18.

Cathode 11 to which water is supplied from nozzle 41 must be made of water-resistant material. The material forming cathode 11 is also required to have an improved water-repellent property to prevent water deposition on the surface thereof which would decrease the effective surface area. A typical example of suitable material for forming cathode 11 is a carbon cloth in which PTFE is embedded. Electrolyte membrane 12 may be NAFION (Trademark of Dupont) membrane of a thickness suitable for permitting water generated at cathode 11 to permeate therethrough toward anode 13. Anode 13 may be made of any desired material but for practicality is preferably the same material as that of cathode 11.

The surfaces of cathode 11 and anode 13 facing electrolyte membrane 11 are coated with a thin film of a predetermined even thickness of a platinum group catalyst which promotes fuel cell reaction between hydrogen in the fuel gas and oxygen in the air. Coating of the catalyst film may be done by sputtering followed by hot-pressing, for example.

The hydrogen source 21 of hydrogen gas supply system 20 is a hydrogen gas bottle 21 of a hydrogen storing alloy such as $LaNi_5$, $TiFe$, $ZrMn_2$, or $Mg_2Ni$, from which hydrogen gas is supplied to anode 13 of fuel cell 10. For example, $LaNi_5$ is known to provide the endothermic reaction $LaNi_5H_6$ $LaNi_5+3H_2$ when heated to about 50–80° C. causing hydrogen gas to be produced at about 300 liters per hour. Another example of hydrogen source 21 comprises a rectifier that rectifies and transforms a raw material such as a water/methanol mixed liquid into a hydrogen-enriched gas which is supplied to a tank and stored therein. When apparatus 1 is installed stationary in a room, hydrogen source 21 may be a fixed gas conduit with a regulation valve.

Gas discharged at anode 13 can be fed through a discharge gas passage 24 with a valve 25 to air intake manifold 14 where it is mixed with the air. Valve 25 regulates the feed rate of the discharge gas from anode 13 to manifold 14. In a modification, there is no discharge gas passage 24, in which case all of the gas discharged at anode 13 is exhausted to the open air.

Although not shown in the drawings, there is mounted a blower that introduces the atmospheric air into air intake manifold 14 of cathode 11 through an air flow passage 31.

As described before, the air introduced into air intake manifold 14 passes through vertically extending grooves 18 throughout the entire surface of cathode 11. A discharge gas from cathode 11 is fed through a passage 32 to a concentrator 33 where water is separated from the discharge gas, and exhausted or circulated through a passage 36 with a control valve 34 that controls the discharge rate. Passage 36 may be connected to passage 31 for re-entry of the remaining gas into cathode 11. Valve 34 may be omitted, in which case all of the discharge gas from cathode 11 is exhausted to the open air.

Water separated from the discharge gas is fed to a water tank 42. The water level in tank 42 is detected by a water level sensor 43 which outputs a signal to an alarm 44 when the water level in tank 42 decreases to below a predetermined level so that the alarm provides some visible and/or audible warning to the operator.

In water supply system 40 of this embodiment, a water supply passage 45 having a pump 46 and a water pressure sensor 47 is connected between tank 42 and nozzle 41 so that water in tank 42 can be supplied to cathode 11. More particularly, a water conduit from tank 42 is connected to nozzle 41 via a pump 46, a water pressure sensor 47 and a water spray pressure control valve 48. Water from tank 42 is regulated by control valve 48 to have an optimum pressure and is sprayed into air intake manifold 14 through nozzle 41. The rate of injection of water from nozzle 41, the weight of the sprayed water and the air flow in air intake manifold 14 are selected and combined so that the sprayed water disperses over the entire surface of cathode 11.

Water introduced onto the surface of cathode 11 takes heat away from the ambient air and the surface itself by evaporation (as latent heat), which thereby not only prevents evaporation of water in electrolyte membrane 12 but also functions to cool cathode 11. The cooling of cathode 11 effectively prevents damage to electrodes 11, 13 and membrane 12 which might otherwise occur due to reaction of the supplied water and the remaining oxygen, i.e. combustion or explosion, during the initial stage of operation of fuel cell power generating apparatus 1. A voltmeter 50 measures a voltage between cathode 11 and anode 13.

Operation of fuel cell apparatus 1 of this embodiment will be described with reference to FIG. 3–FIG. 6. A control unit 70 comprising a microprocessor and a memory 73 are installed in a control box (not shown in FIG. 1) of apparatus 1. Memory 73 stores the control programs that govern operation of control unit 70. Various parameters and look-up tables to be used in control procedures executed by control device 70 are also stored in memory 73.

Hydrogen gas supply system 20 is operated as follows. During the initial stage of operation of apparatus 1, hydrogen discharge valve 25 remains closed and hydrogen gas supply control valve 23, provided in a hydrogen gas supply passage 22, is adjusted to allow hydrogen gas, of a predetermined concentration below the explosive limit, to be supplied from source 21 to anode 13.

While apparatus 1 is running with valve 25 closed, the partial pressure of hydrogen in the gas consumed at anode 13 is gradually lowered, under the influence of nitrogen and oxygen in the air supplied to cathode 11 and water generated at cathode 11 which permeates through electrolyte membrane 12, thereby degrading and unstabilizing the electric power output from fuel cell 10. Accordingly, valve 25 is opened in accordance with a prescribed valve control program to exhaust the deleterious gas from anode 13 and to refresh the gas at anode 13. The valve control program is stored in memory 72 and read out therefrom by control unit 70 to open or close valve 25 and control the degree of opening of valve 23. In one preferred embodiment, the program opens valve 25 over a predetermined period (1 second, for example) when the output voltage measured by voltmeter 50 decreases to below a predetermined critical value. In another embodiment, the program may intermittently open and close valve 25 with a predetermined interval which is substantially the same or slightly shorter than an experimentally determined period of time in which the output voltage should begin to decrease and beginning with the start-up of fuel cell 10.

Air supply system 30 operates as follows. The atmospheric air is supplied through air passage 31 to air intake manifold 14 with a predetermined pressure. A portion of the exhaust gas from cathode 11 is exhausted from the system, depending on the degree of opening of valve 34 which is controlled by control unit 70 in accordance with a predetermined air discharge control program in memory 73. In a preferred embodiment, however, valve 34 may have a fixed degree of opening because the water balance in fuel cell 10 is regulated by water supply system 40 in a manner to be described below.

In operation of water supply system 40, water is pumped up by pump 46 from tank 42 and controlled by valve 48 to have an optimum pressure, which, in the form of water droplets, is sprayed onto the surface of cathode 14 by means of nozzle 41 mounted in the air intake manifold near cathode 11. The water supply quantity is controlled by control unit 70 in accordance with a predetermined water supply control program in memory 73.

Figure 4:
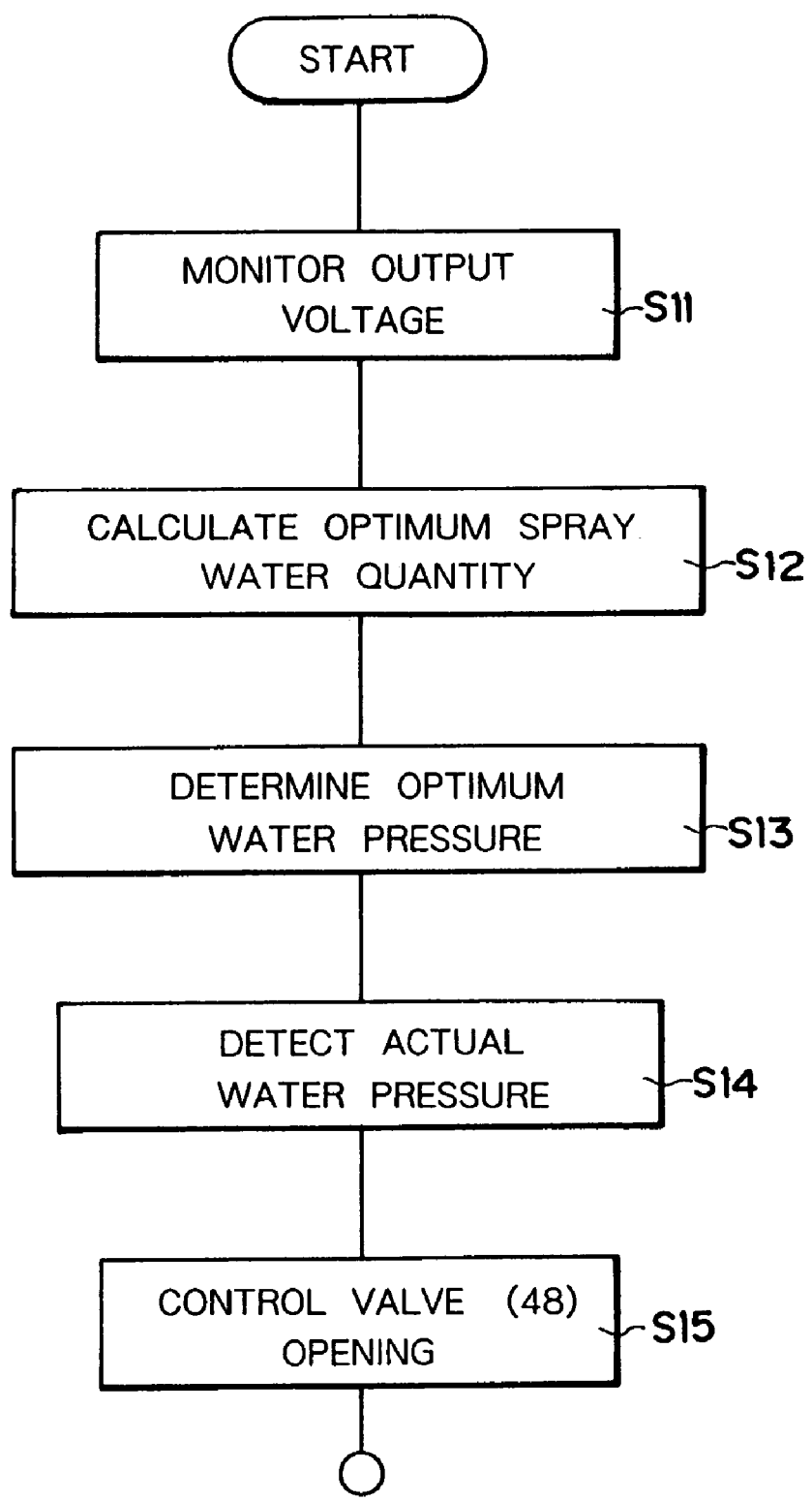
FIG. 4 is a flowchart showing a liquid water supplying operation of the apparatus shown in FIG. 1.

Referring now specifically to the flowchart of FIG. 4, in this embodiment, control unit 70 monitors the output voltage between cathode 11 and anode 13 measured by voltmeter 50, at step S11, to calculate an optimum spray water quantity depending on the measured output voltage, at S12. This calculation may be done by using a predetermined formula or look-up table in memory 73. Preferably, the optimum spray water quantity is determined so as to maintain a proper moisture condition in electrolyte membrane 12 and the temperature of fuel cell 10 within a suitable temperature range. As will be described hereinlater, fuel cell 10 may be effectively cooled by utilizing the latent heat of evaporation of water, even with a relatively small quantity of spray water. In normal control, water supply system 40 starts up when the output voltage decreases to below a predetermined value or when the output voltage varies in a range greater than a predetermined width.

Figure 5:
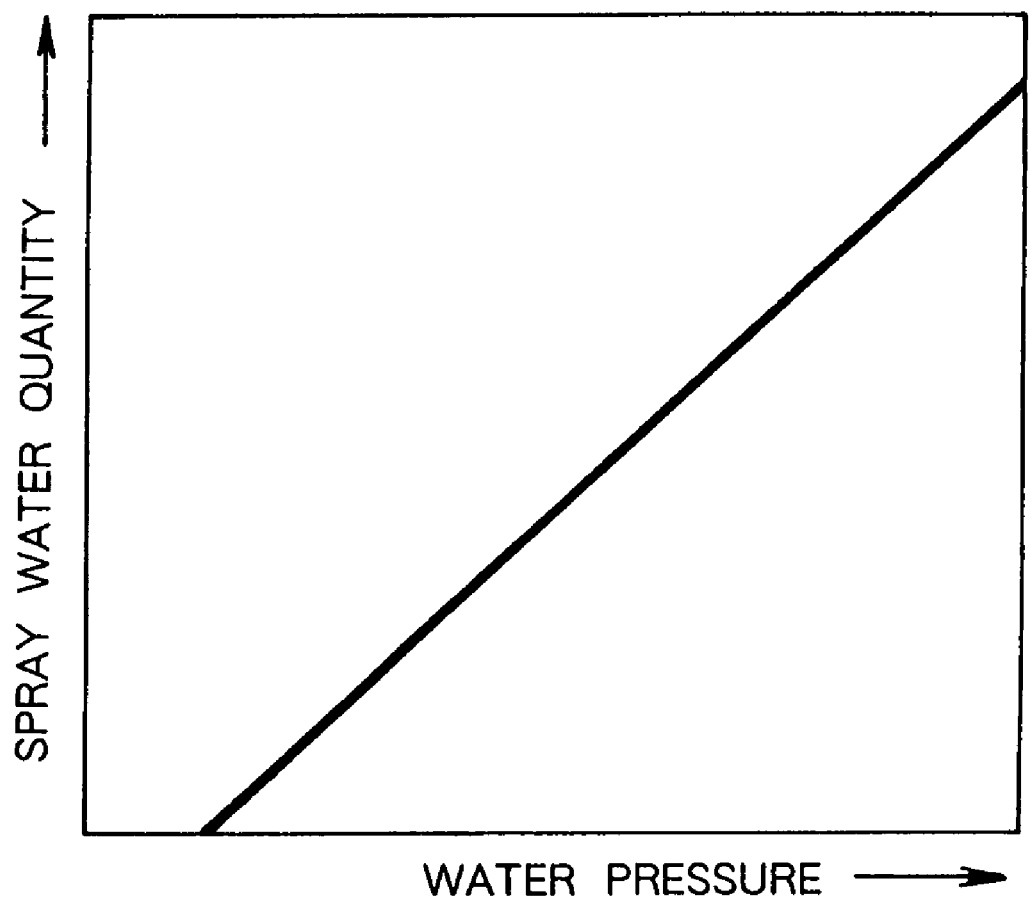
FIG. 5 is a graph showing the relationship between the quantity of spray water and the water pressure.

Then, at step S13, control unit 70 calculates an optimum water pressure based on the optimum quantity of spray water thus determined. Since there is a proportional relationship between the spray water quantity and the water pressure, an example of which is shown in FIG. 5, a formula or look-up table representing this relationship is stored in memory 73. In this embodiment, the degree of opening of valve in a circulating passage 49 is adjusted to control the pressure of water sprayed through nozzle 41, while supplying constant power to pump 46. In this manner of control, the spray water pressure decreases as the opening of valve 48 increases. Accordingly, at step S14, control unit 70 performs feedback control in which it controls the degree of opening valve 48 so that the actual water pressure measured by a water pressure sensor 47 becomes identical to an optimum spray water pressure which has been determined at S13. In another control routine, water supply system 40 is periodically operated with a predetermined constant water pressure over a predetermined time interval (5–10 seconds, for example).

Figure 6:
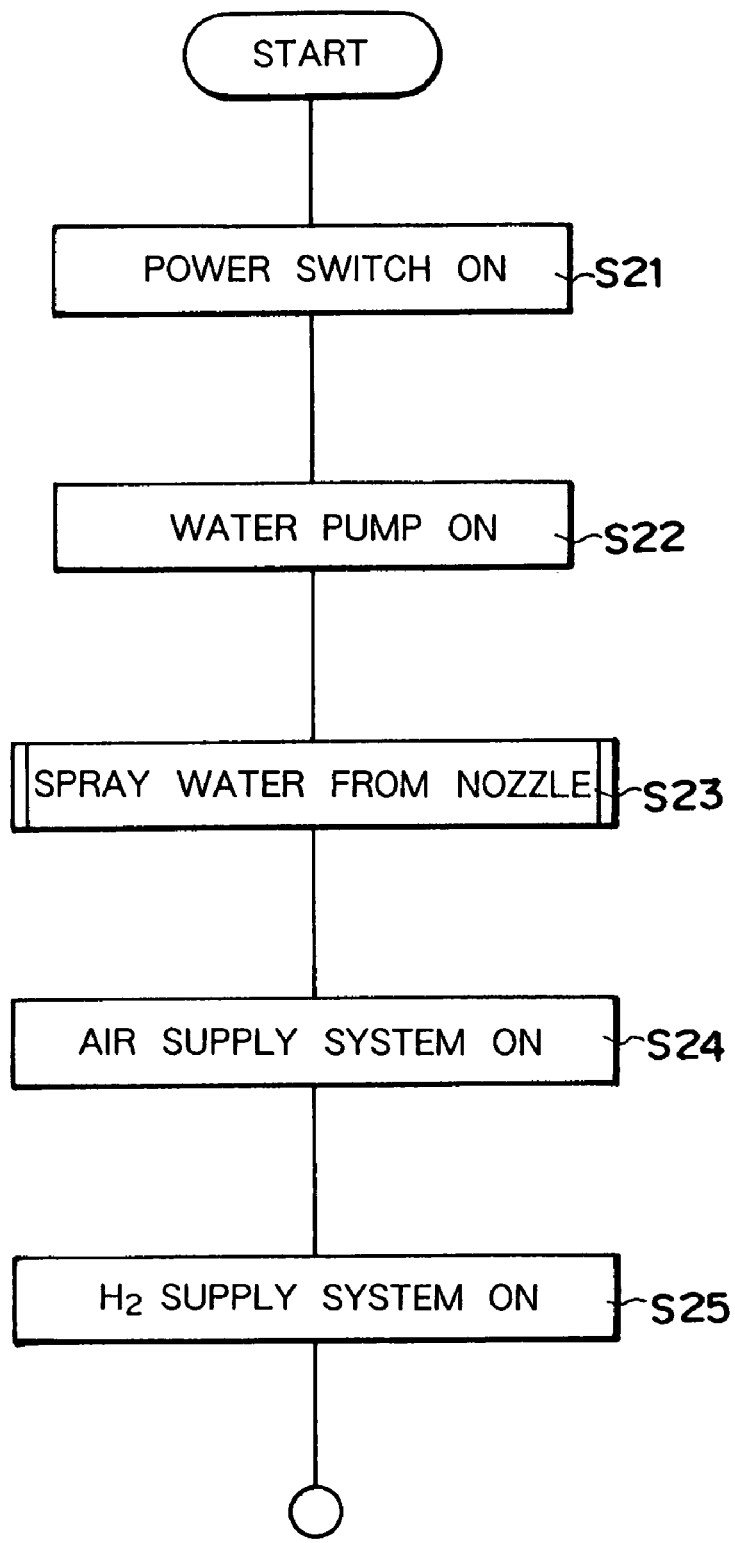
FIG. 6 is a flowchart showing the start-up operation of the apparatus shown in FIG. 1.

FIG. 6 is a flowchart showing the control procedure at the start-up of apparatus 1. When apparatus 1 is energized by operating a power switch (not shown) at step S21, water pump 46 is also energized at step S22. Water is sprayed from nozzle 41 in a given quantity at step 23. Normally, the water spray quantity is regulated by adjusting the degree of opening of valve 48 in the manner described in connection with the flowchart of FIG. 4. To prevent fuel cell 10 from damage which could occur due to the aforementioned extraordinary reaction, water in a quantity greater than that in the normal control is sprayed onto cathode 11. Then, air supply system 30 and hydrogen supply system 20 are started successively at steps S24 and S25. After the output voltage between cathode 11 and anode 13 reaches a predetermined level, it is actually supplied to an external device.

Regarding the start-up times of the hydrogen supply system 20, air supply system 30 and water supply system 40, air supply system 30 may be started before or after start-up of water supply system 40. Hydrogen supply system 25 may be started before start-up of air supply system, in which case step S25 precedes step S24 in the flowchart of FIG. 6. However, it is absolutely necessary to start water supply system 40 before hydrogen supply system 20 begins to run. Because there is air in apparatus 1, irrespective of operation of air supply system 30, if hydrogen should be supplied while electrolyte membrane 12 is not yet sufficiently moistened, an extraordinary combustion could occur as has been described hereinbefore, which combustion would generate heat to quickly raise the temperature of fuel cell 10, which could not then be cooled down to the normal operation temperature by normal cooling equipment attached thereto, causing damage to the catalyst and/or electrolyte membrane 12. To prevent such damage, it is necessary to spray water onto cathode 11 before hydrogen is supplied to anode 13. This mode of operation will allow membrane 12 to be properly moistened and also utilize the generated heat for evaporation of the sprayed water.

Figure 7:
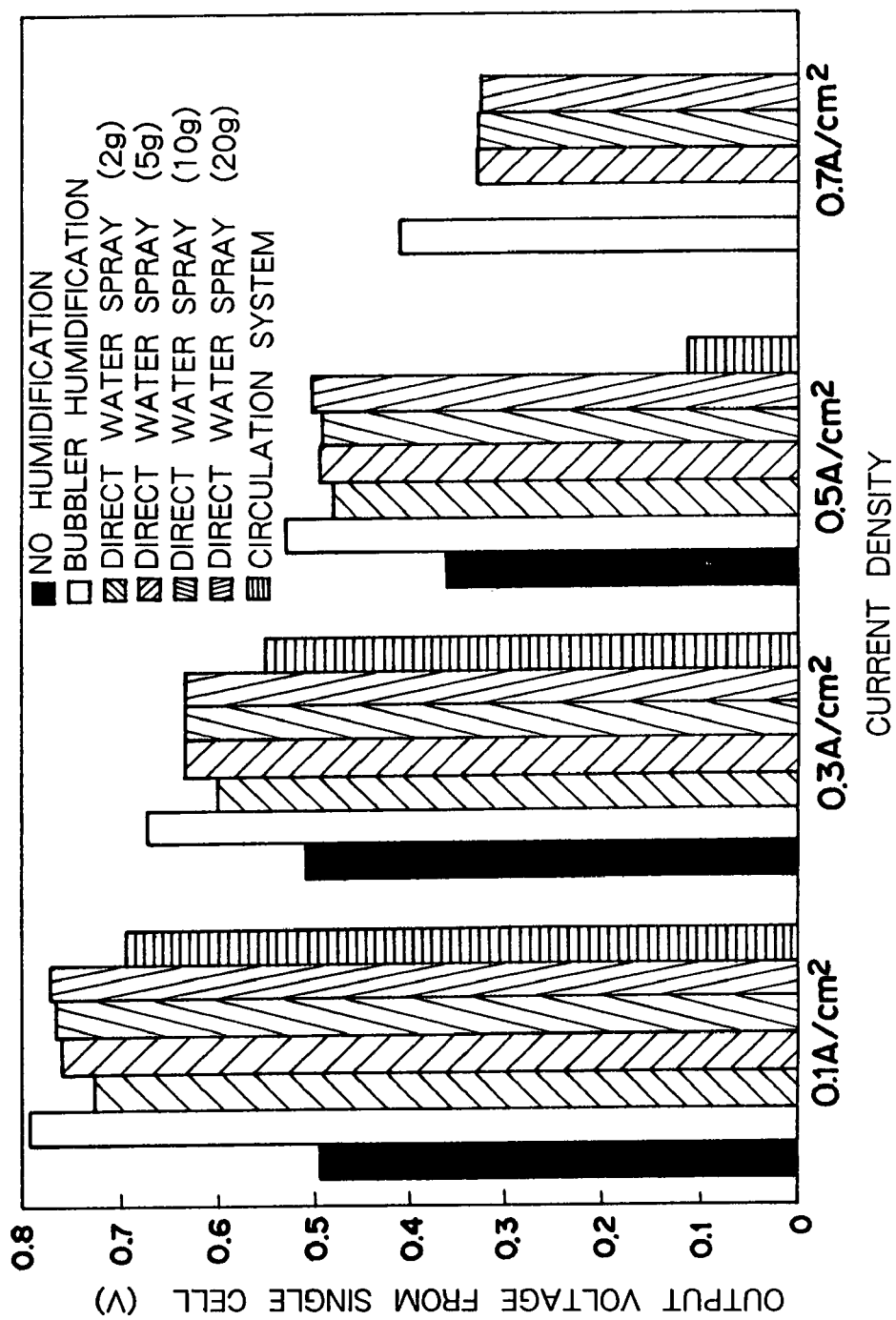
FIG. 7 is a graph showing the relationship between different water sprays and the resulting fuel cell outputs.

FIG. 7 shows the relationship between the water supply in different ways and the resulting output voltages from the 200W class fuel cell stack. The output voltages in FIG. 7 indicate values after 15 minutes from the start-up of fuel cell 10. Shown on the abscissa are current densities of the load between cathode 11 and anode 13. In examples characterized as "no humidification" no water is supplied, in which case hydrogen gas introduced into anode 13 is not fed to cathode 11 but exhausted to the open air. In examples characterized by "bubbler humidification", vapor is incorporated into the air to be supplied to cathode 11 and the air is heated to approximately 65 as in the conventional fuel cell operation. Referred to by "direct water spray" are examples of the present invention in which 2 g, 5 g, 10 g and 20 g water at normal temperature are sprayed onto the surface of cathode 11 per minute and per cell.

As can be seen in FIG. 7, the examples of the present invention show relatively high output voltages comparable with those of the conventional examples having the humidifying device. The minimal level of the quantity of the spray water which is deemed to be effective to generate an output voltage comparable with the conventional fuel cell will vary case by case depending upon the type and design of the fuel cell. Approximately 30% of the total water quantity that can be evaporated by air flowing through cathode 11 could be deemed as a minimum quantity of the sprayed water in normal operation.

Figure 8:
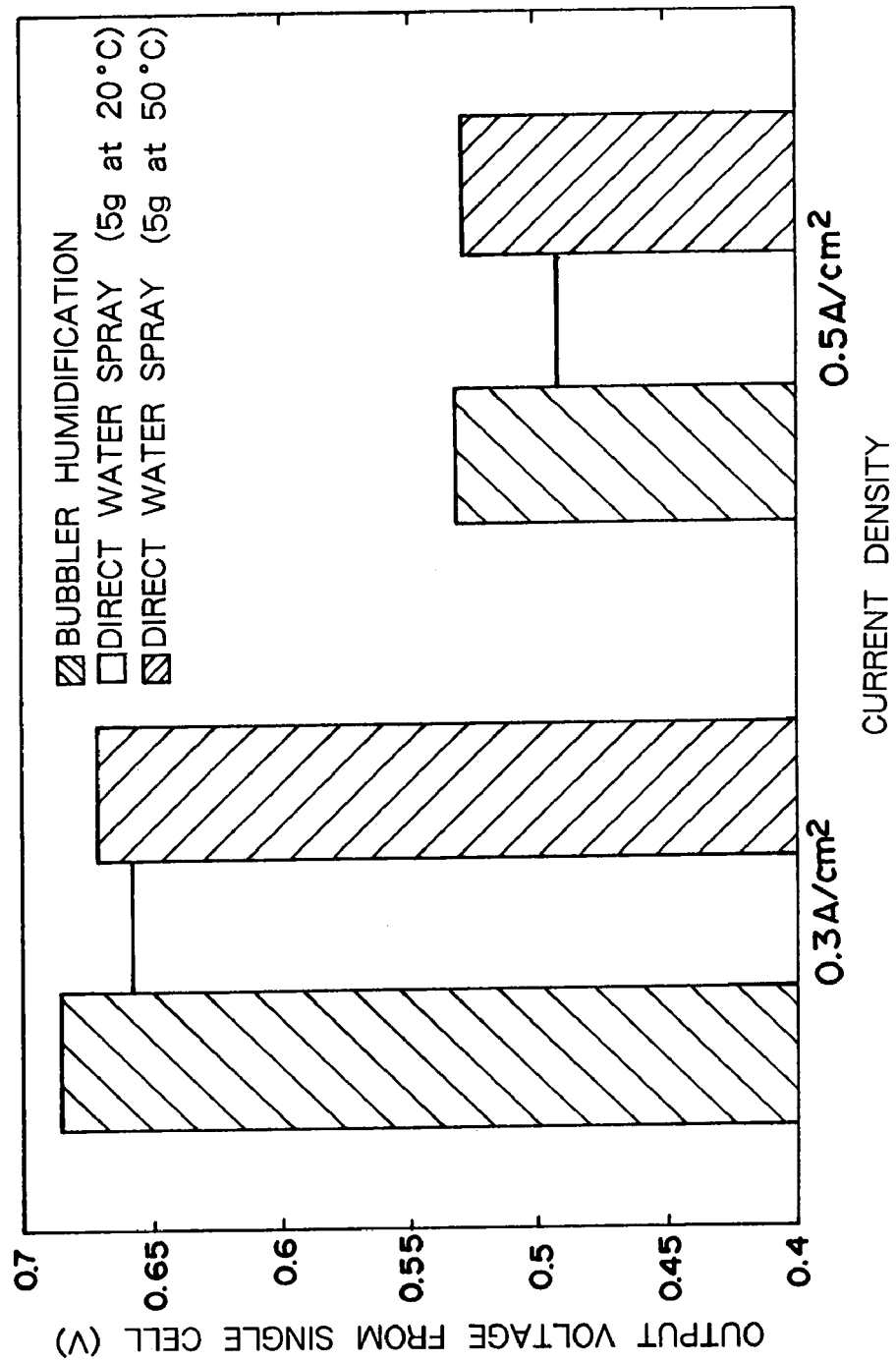
FIG. 8 is a graph showing the relationship between the fuel cell outputs and the spray water temperatures.

FIG. 8 shows the relationship between the output voltage and the temperature of the spray water. It is apparent that the output voltage can be increased to a level substantially identical to that of the conventional operation with a humidifying device, by raising the temperature of the spray water. Accordingly, it is preferable to preheat water to be supplied to cathode 11. The temperature of the spray water should preferably be in a range of 40–60° C., more preferably a range of 45–55 ° C., still more preferably approximately 50° C.

Figure 9:
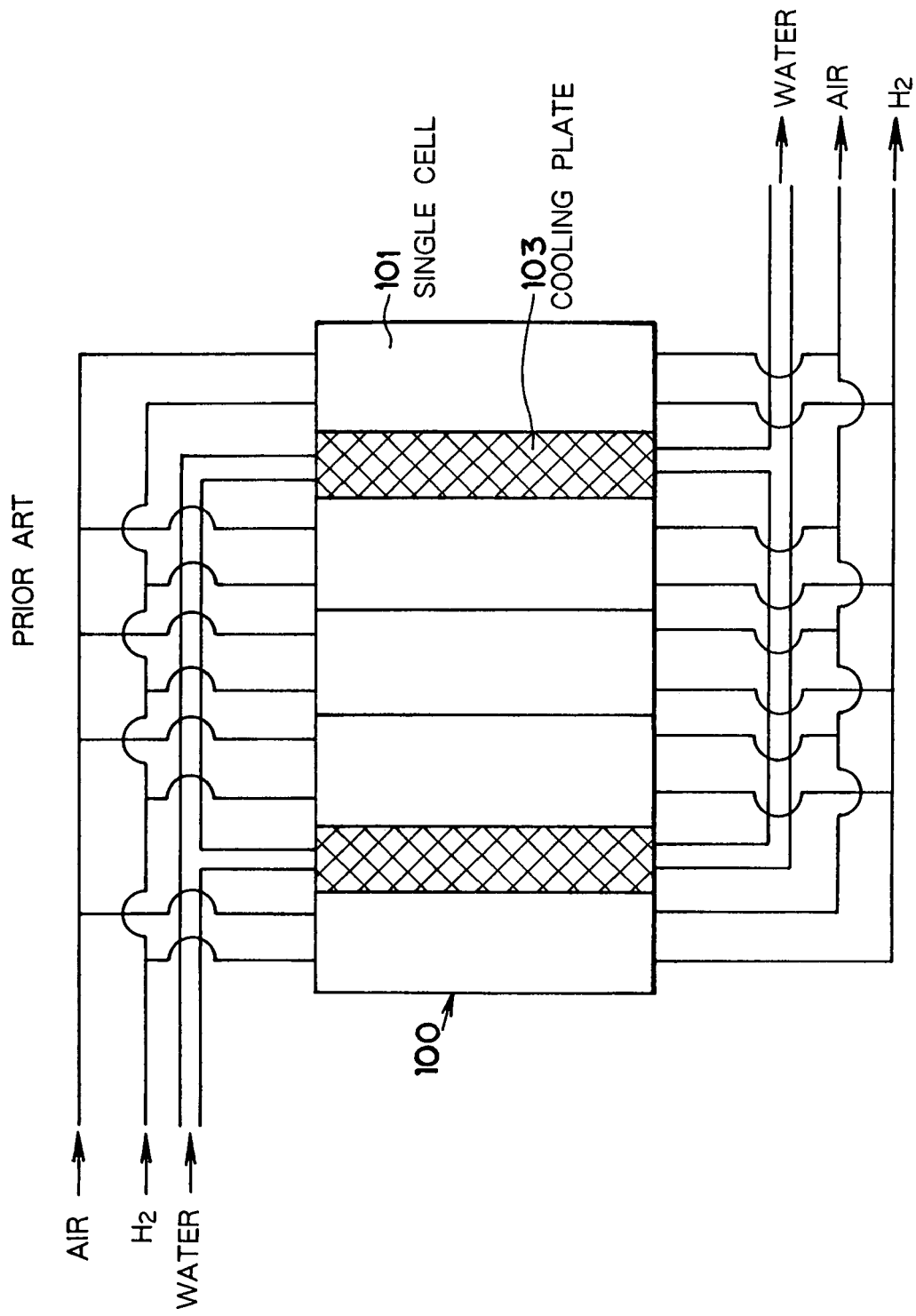
FIG. 9 is an explanatory view showing the prior art fuel cell stack structure.

The following tests were made to confirm that the water spray to the cathode is also effective to cool the fuel cell. The test apparatus was similar to that shown in FIG. 9 but has nine cells 101. Water having a temperature of 40° C., 60° C. or 80° C. was caused to pass through cooling plates 103 to heat fuel cell stack 100. Temperature of fuel cell stack 100 after water spraying was measured under different conditions, which are shown, together with the test results, in the table of FIG. 11.

In tests No. 1–No. 4, water of 40° C. was passed through cooling plates 103 to create a false operating condition in which fuel cell stack 100 operates at 40° C., and water in different quantities was sprayed onto the cathode. In tests No. 5–No. 8, water at 60° C. was passed through cooling plates 103 to create a false operating condition in which fuel cell stack 100 operates at 60° C., and water in different quantities was sprayed onto the cathode. Likewise, in tests No. 9–No. 12, water at 80° C. was passed through cooling plates 103 to create a false operating condition in which fuel cell stack 100 operates at 80° C., and water in different quantities was sprayed onto the cathode.

Figure 12:
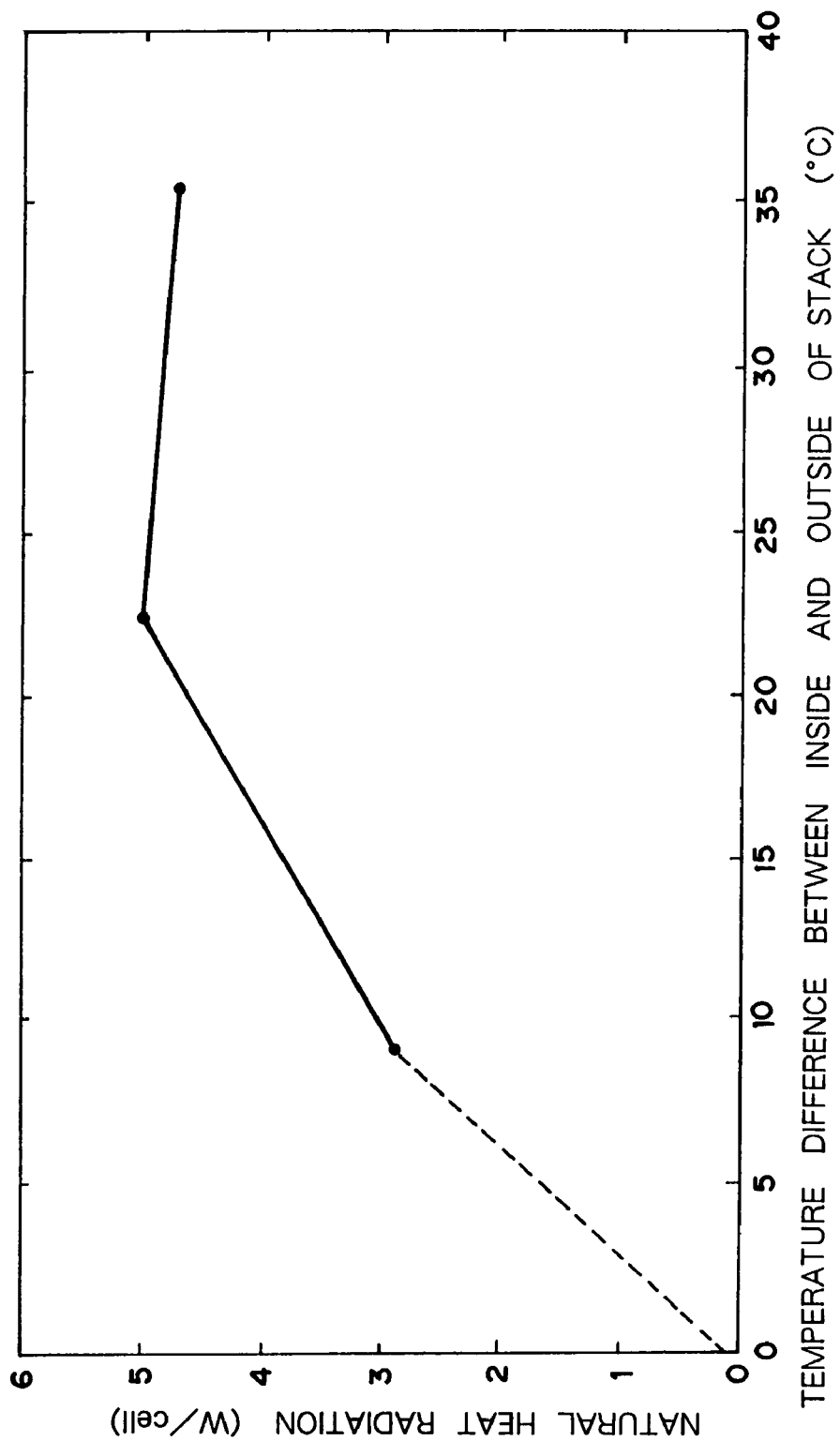
FIG. 12 is a graph showing the relationship between the temperature difference between inside and outside of the fuel cell and natural heat radiation, which was determined by the test results shown in FIG. 11.

FIG. 12 shows the relationship between the temperature difference between the fuel cell and the atmospheric air and the natural heat radiation, which relationship was determined by the test results shown in FIG. 11. More specifically, data was obtained from the difference between water temperature at the inlet and at the outlet of cooling plates 103 in tests No. 1, No. 5 and No. 9 in which no water was sprayed onto the cathode. These test results indicate how the fuel cell stack having no cooling means is cooled by natural heat radiation alone. As shown in FIG. 12, the natural heat radiation in the test fuel cell stack was 5 w at the utmost per cell. It is believed that the natural heat radiation will be decreased as the difference between the fuel cell temperature and the atmospheric air temperature becomes smaller.

Figure 13:
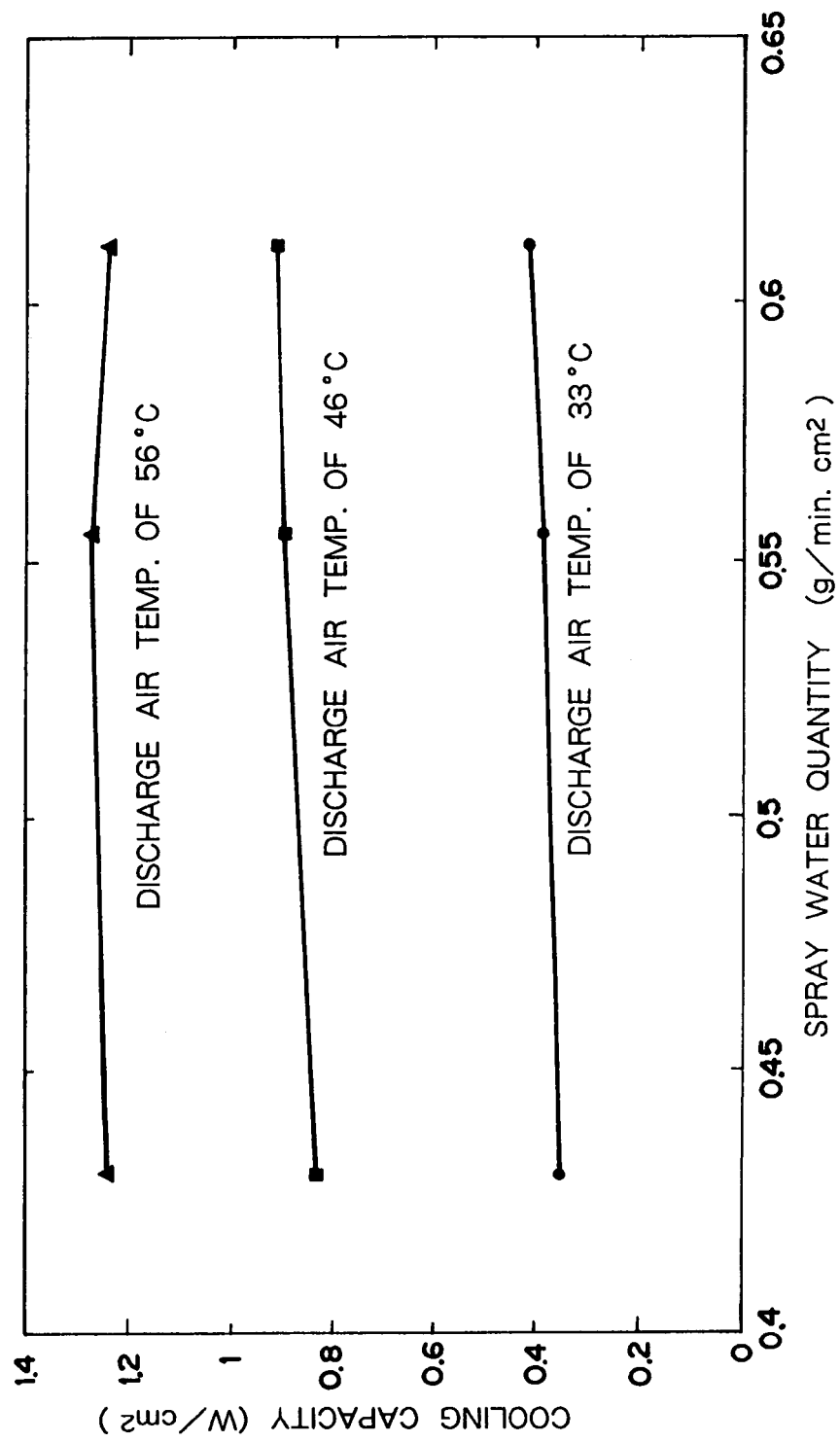
FIG. 13 is a graph showing the relationship between the spray water quantity and the cooling capacity, which was also determined by the test results shown in FIG. 11.

FIG. 13 shows the relationship between the spray water quantity and the cooling capacity, which was also determined by the test results shown in FIG. 11. As shown, no substantial change in the cooling capacity could be recognized even when the spray water quantity increases. Rather, it is concluded that the discharge gas temperature has a greater influence on the cooling capacity.

Figure 14:
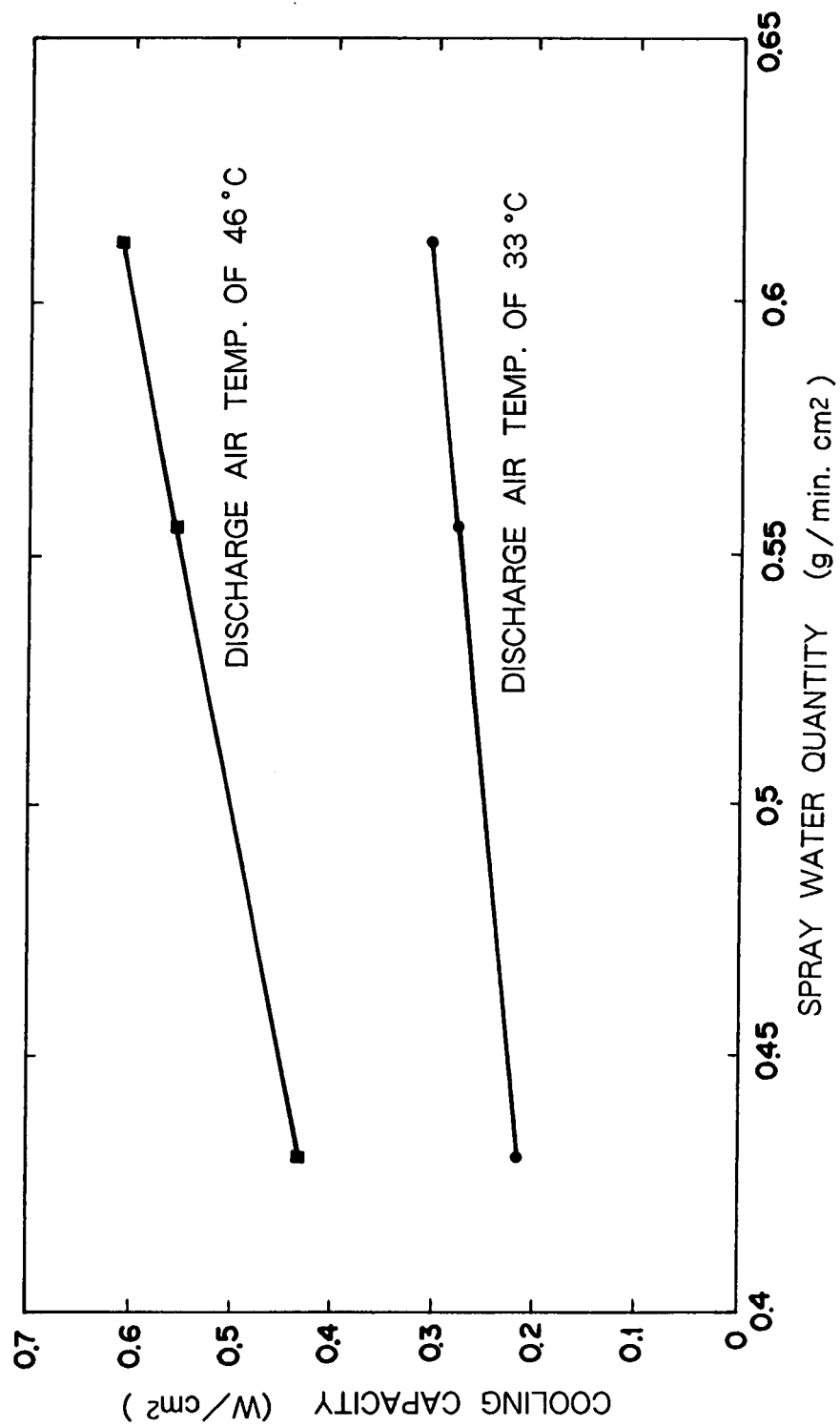
FIG. 14 is a graph showing the relationship between the spray water quantity and the cooling capacity by sensible heat, which was also determined by the test results shown in FIG. 11.

FIG. 14 shows the relationship between the spray water quantity and the cooling capacity of sensible heat, which was also determined by the test results shown in FIG. 11. The sensible heat means heat removed from the fuel cell stack when the sprayed water (26° C.) is raised to the respective discharge gas temperature (33° C. and 46° C. in FIG. 14) while the sprayed water is kept in a liquid state that is, with no evaporation. As shown, though the cooling capacity by sensible heat is gradually increased with the spray water quantity, the discharge gas temperature has a greater influence on the cooling by sensible heat.

Figure 15:
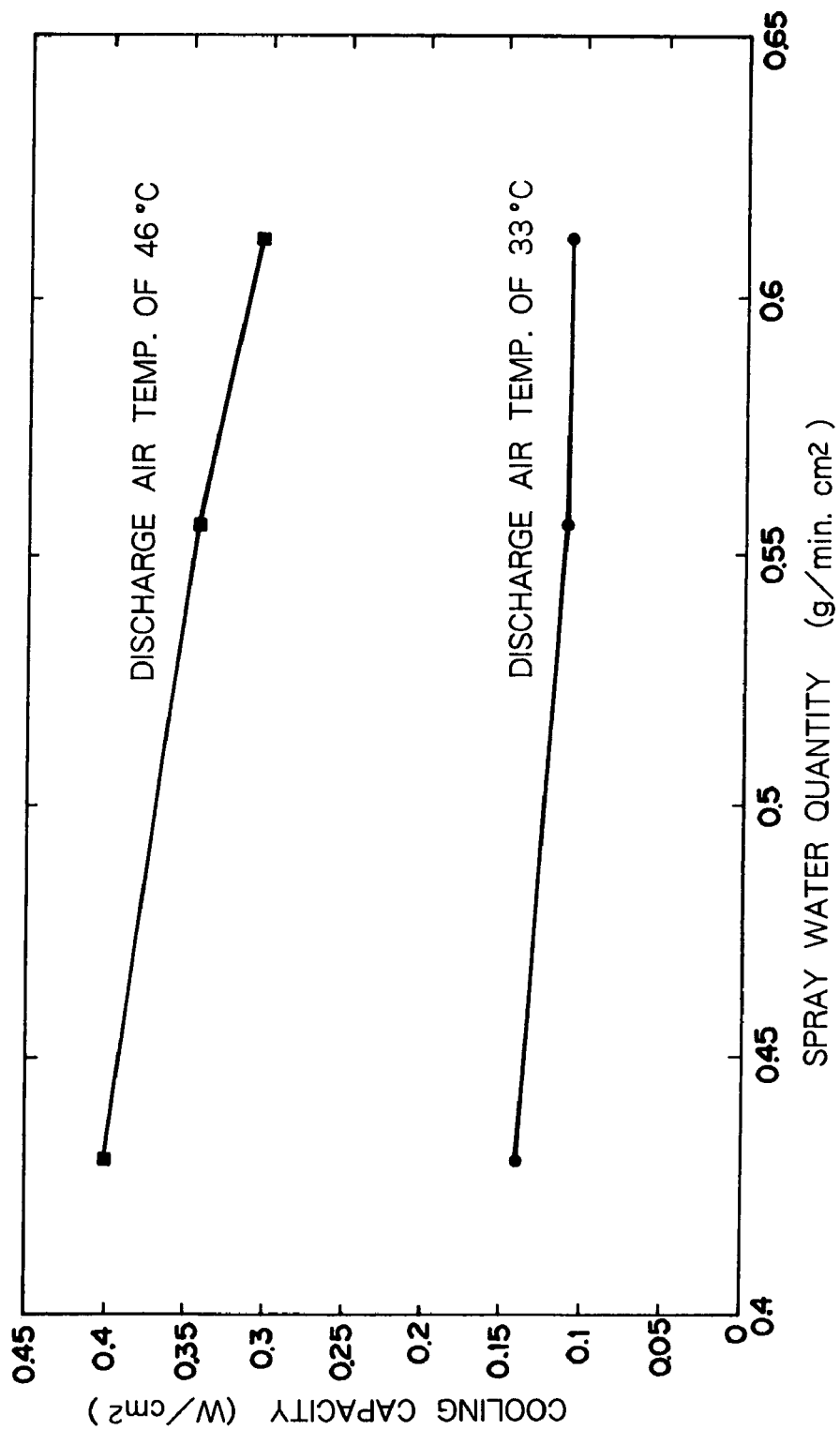
FIG. 15 is a graph showing the relationship between the spray water quantity and the cooling capacity by latent heat, which was also determined by the test results shown in FIG. 11.

FIG. 15 shows the relationship between the spray water quantity and the capacity for cooling by latent heat, which was also determined from the test results shown in FIG. 11. The latent heat means the heat removed from the fuel cell stack by evaporation of the sprayed water. As shown, the capacity for cooling by latent heat tends increase as the spray water quantity decreases. Still, the discharge gas temperature has a greater influence on the capacity for cooling by latent heat of the sprayed water.

The graphs shown in FIGS. 13–15 show that liquid water sprayed onto the surface of cathode 11 has a capacity for cooling by sensible heat (FIG. 14) and capacity for cooling by latent heat (FIG. 15), the sum of which is shown as the total cooling capacity at the ordinate of the graph in FIG. 13. As a result of the inventors' extensive experimentation regarding the cooling capacity of the water spray in still smaller quantities than those shown in FIGS. 13–15, similar results have been obtained. More specifically, a smaller quantity of spray water has less capacity for cooling by sensible heat but compensates therefore by an increased capacity for cooling by latent heat, to give substantially the same total cooling capacity, as seen from the graph in FIG. 13. The quantity of water to be sprayed in a particular design of apparatus 1 should be determined so as to provide the maximum cooling capacity of latent heat, which actually depends on the output volume from fuel cell 10, its size, its operating temperature, etc. In any event, since the spray water quantity is not critical, as explained above, there is no need to spray water in a large quantity because a large quantity is undesirable in view of the size and cost of the water supply system 40.

Figure 10:
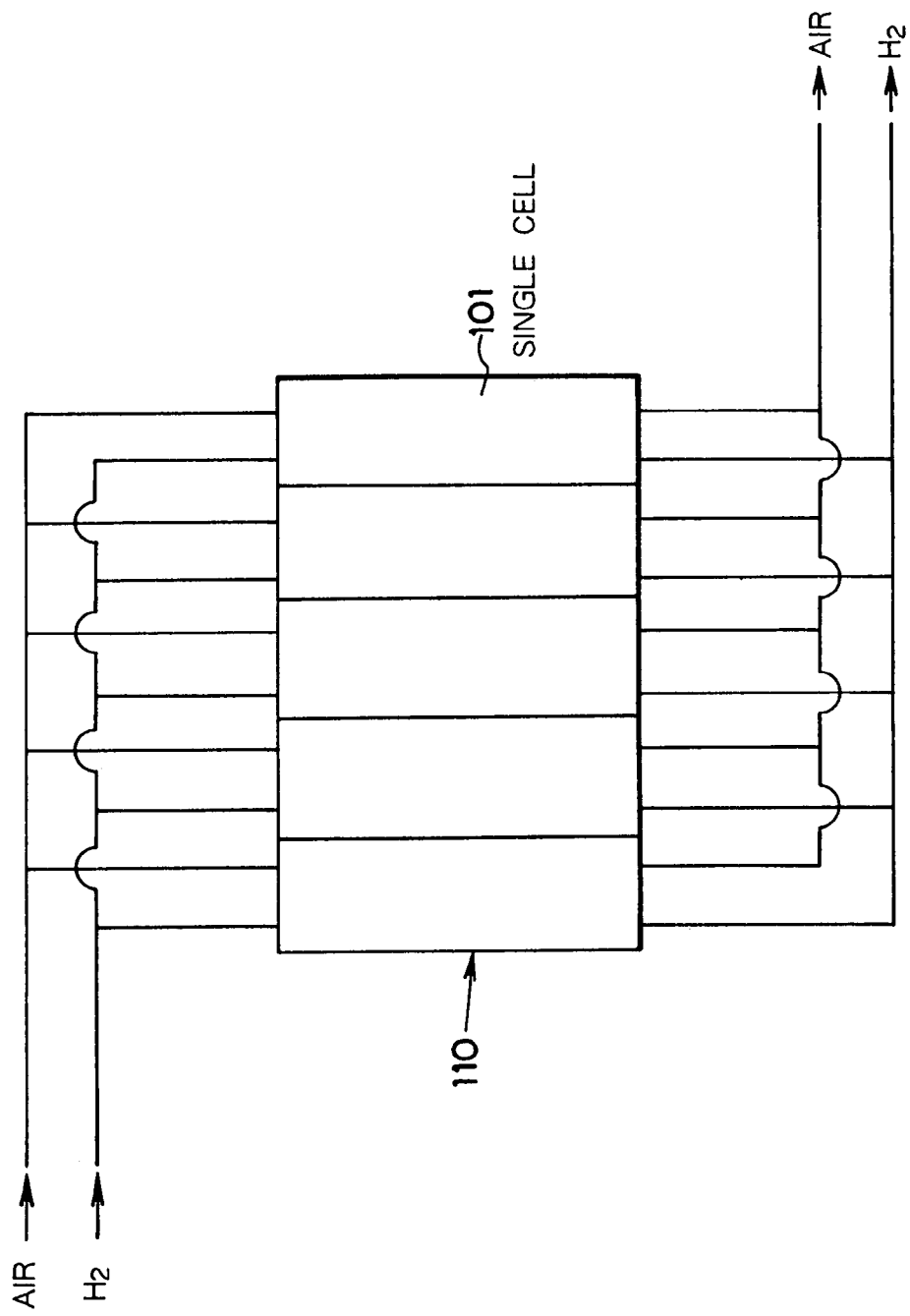
FIG. 10 is an explanatory view showing the fuel cell stack structure according to the present invention.
Figure 16:
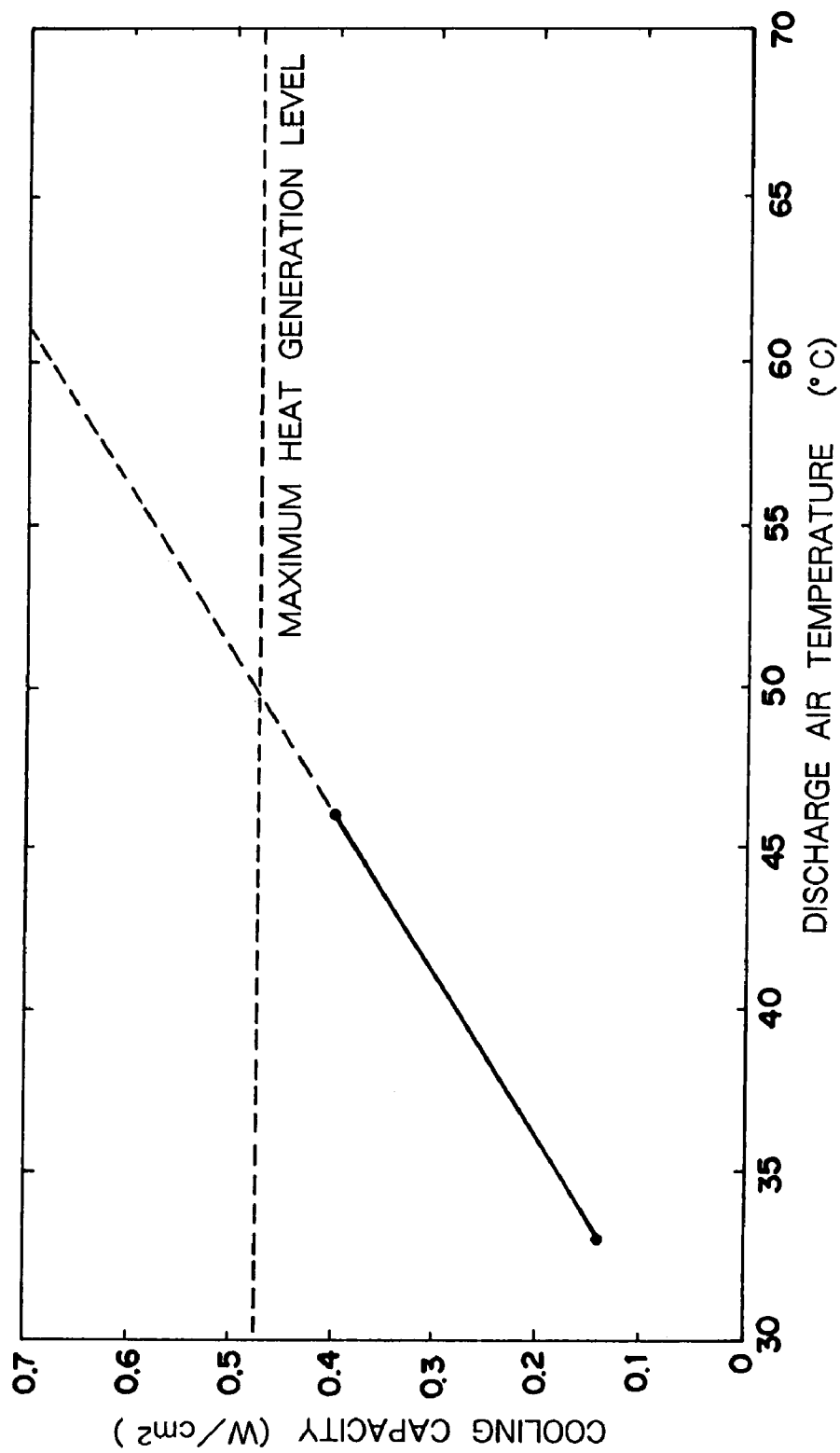
FIG. 16 is a graph showing relationship between the discharge gas temperature and the cooling capacity by latent heat, which was also determined by the test results shown in FIG. 11.

FIG. 16 shows the relationship between the discharge gas temperature and the cooling capacity of latent heat, which was also determined by the test results shown in FIG. 11. The dotted line indicates the anticipated maximum heat generation level per unit area ($cm^2$) of the fuel cell stack in operation. The cooling capacity obtained with the discharge gas temperature ranging from 33° C. to 46° shown by a solid line in FIG. 16 do not reach the maximum level of heat generation of the fuel cell stack. It can be observed that the cooling capacity by latent heat of the sprayed water will increase proportionally with the discharge gas temperature. Accordingly, it should be concluded that when the fuel cell stack operates at a temperature higher than 50° C. the cooling capacity by latent heat of the sprayed water exceeds the maximum heat generation level of the fuel cell stack, that is, a sufficient cooling capacity could be obtained during operation of the fuel cell stack. This means that the fuel cell stack of the present invention in which water is sprayed onto the cathode does not require cooling plates 103 and may have a simple stack arrangement as shown in FIG. 10, which provides higher efficiency and lower weight of the fuel cell stack.

As has been described in detail, in accordance with the present invention water sprayed onto the cathode surface takes away from the surrounding air as latent heat to prevent evaporation of water in the electrolyte membrane which, therefore, remains in a desired moist condition. Water sprayed onto the cathode surface will also be effective to cool the fuel cell and the fuel cell stack to control the temperature of the fuel cell stack in operation, which means that no additional cooling medium needs to be passed therethrough. The fuel cell system of the present invention is simple in construction, can be manufactured at lower cost and provides improved capacity and durability.

Although the present invention has been described in conjunction with specific embodiments thereof, it is to be understood that it is capable of considerable variation and modification without departure from the scope of the appended claims. For example, the water spray nozzle is preferably mounted to the air intake manifold at the cathode but may be provided at any location and at any distance from the cathode, as long as it may supply liquid water to the cathode. When the fuel cell system is installed in a factory or home, it may be connected to waterworks so that city water is supplied to the cathode.

We claim:

1. A method of operating a fuel cell having an anode, a water-repellant cathode, a proton exchange electrolyte membrane interposed between the anode and cathode, and a separator having grooves formed in one surface thereof, said grooves extending straight continuously in completely spanning the one surface between opposing first and second ends thereof, the one surface of the separator being in contact with said cathode with said grooves open to and closed by said cathode, said method comprising:

generating water by reaction of oxygen with hydrogen at the cathode, the water moving from the cathode to the anode;

maintaining the electrolyte membrane in a moist condition by permeation of the generated water through the electrolyte membrane, from the cathode toward the anode;

providing the cathode comprising PTFE embedded in carbon cloth forming one surface which is in contact with the separator and which is water-repellent and a catalyst coating forming a second surface opposite the one surface and facing the electrolyte membrane;

supplying a gas containing hydrogen to the anode via a first gas flow passage;

supplying a gas containing oxygen to the cathode via a second gas flow passage formed separately from from said first gas flow passage; and supplying water to one end of the second gas flow passage for contact in liquid state with the water-repellent surface of the cathode and for removing heat as latent heat, thereby cooling the fuel cell, said water-repellency preventing water deposition on the cathode which would decrease the effective surface area of the cathode.

2. A fuel cell operating method according to claim 1 further comprising detecting an output voltage of the fuel cell and controlling a quantity of water supplied in response to the detected output voltage.

3. A fuel cell operating method according to claim 1 further comprising calculating an optimum quantity of water as that quantity of water determined to maintain temperature of the fuel cell within a predetermined temperature range and controlling the supplying to supply the calculated optimum quantity of liquid water onto the surface of the cathode.

4. The operating method according to claim 1 wherein the catalyst coating is a thin film of a predetermined even thickness of a platinum group catalyst.

5. A fuel cell operating method according to claim 1 wherein the quantity of water supplied is an amount determined to provide maximum cooling by vaporization.

6. A fuel cell operating method according to claim 1 wherein the moist condition of the electrolyte membrane is maintained only by the water generated at the cathode.

7. A method of operating a fuel cell having a solid polymer electrolyte membrane interposed between an anode and a cathode and a separator arranged opposed to the anode or the cathode and including a flow passage for supplying gas, comprising:

providing the solid electrolyte membrane with a thickness allowing water generated at the cathode to permeate through the solid electrolyte membrane toward the anode, thereby maintaining the electrolyte membrane in a moist condition;

providing the cathode comprising carbon cloth with embedded PTFE forming a first surface facing the separator and a catalyst coating forming a second surface of the cathode facing the electrolyte membrane; and supplying liquid water in droplet form into one end of the flow passage and into contact with the first, water-repellent surface of the cathode, vaporization of the water in the flow passage serving to cool the fuel cell.

8. A fuel cell operating method according to claim 7 wherein said supplying is intermittent.

9. A fuel cell operating method according to claim 7 wherein the liquid water is dispersed over the entire surface of the cathode.

10. A fuel cell operating method according to claim 7 wherein the water is supplied at a predetermined constant pressure over a predetermined time interval.

11. A fuel cell operating method according to claim 7 further comprising detecting an output voltage of the fuel cell and controlling a quantity of water supplied in response to the detected output voltage.

12. A fuel cell according to claim 7 further comprising calculating an optimum quantity of water as that quantity of water determined to maintain a proper moisture content within the electrolyte membrane and controlling the liquid water supplied to provide the calculated optimum quantity of liquid water onto the surface of said cathode.

13. A fuel cell operating method according to claim 7 further comprising calculating an optimum quantity of water as that quantity of water determined to maintain temperature of the fuel cell within a predetermined temperature range and controlling the supplying to supply the calculated optimum quantity of liquid water onto the surface of the cathode.

14. A fuel cell operating method according to claim 7 wherein the electrolyte membrane has a thickness allowing water produced by fuel cell reaction at the cathode to permeate through the membrane toward the anode.

15. A fuel cell operating method according to claim 7 wherein the catalyst coating is a thin film of a predetermined even thickness of a platinum group catalyst.

16. A fuel cell operating method according to claim 7 wherein the quantity of water supplied is an amount determined to provide maximum cooling by vaporization.

17. A fuel cell operating method according to claim 7 wherein the moist condition of the electrolyte membrane is maintained only by the water generated at the cathode.

* * * * *

UNITED STATES PATENT AND TRADEMARK OFFICE
CERTIFICATE OF CORRECTION

| | |
|---|---|
| PATENT NO. | : 7,029,775 B2 |
| APPLICATION NO. | : 09/917662 |
| DATED | : April 18, 2006 |
| INVENTOR(S) | : Horiguchi et al. |

It is certified that error appears in the above-identified patent and that said Letters Patent is hereby corrected as shown below:

Column 11, line 28 (claim 1, line 25) "from from" should read -- from --.

Signed and Sealed this

Twenty-first Day of November, 2006

JON W. DUDAS
*Director of the United States Patent and Trademark Office*